(12) United States Patent
De Sernia et al.

(10) Patent No.: US 9,232,778 B1
(45) Date of Patent: Jan. 12, 2016

(54) GIMBAL COVER AND METHOD OF USE

(76) Inventors: Thomas Joseph De Sernia, Boca Raton, FL (US); Thomas De Sernia, Boca Raton, FL (US)

(*) Notice: Subject to any disclaimer, the term of this patent is extended or adjusted under 35 U.S.C. 154(b) by 432 days.

(21) Appl. No.: 13/592,318

(22) Filed: Aug. 22, 2012

Related U.S. Application Data (60) Provisional application No. 61/528,162, filed on Aug. 27, 2011, provisional application No. 61/569,767, filed on Dec. 12, 2011.

(51) Int. Cl.
*A01K 87/08* (2006.01)
*A01K 87/00* (2006.01)
*A01K 97/10* (2006.01)

(52) U.S. Cl.
CPC ............... *A01K 87/08* (2013.01); *A01K 87/00* (2013.01); *A01K 97/10* (2013.01)

(58) Field of Classification Search
CPC ..... A01K 87/08; A01K 87/085; A01K 87/00; A01K 97/10
USPC ........ 43/23, 25, 21.2, 18.1 R; 16/108; 138/96, 138/96 R; 135/77, 82, 86; 81/13, 451–458
See application file for complete search history.

(56) References Cited

U.S. PATENT DOCUMENTS

| | | | | |
|---|---|---|---|---|
| 1,433,882 | A * | 10/1922 | Fancher et al. | 16/108 |
| 2,232,107 | A * | 2/1941 | Gall | 43/25 |
| 2,952,285 | A * | 9/1960 | Roosli | 81/453 |
| 2,985,208 | A * | 5/1961 | Hibbard et al. | 81/452 |
| 3,287,844 | A * | 11/1966 | Hoxter | 43/23 |
| 3,443,335 | A * | 5/1969 | Guydos | 43/23 |
| 3,516,111 | A * | 6/1970 | Heyman | 16/2.1 |
| 3,531,888 | A * | 10/1970 | Wells et al. | 43/23 |
| 3,745,690 | A * | 7/1973 | Lewis | 43/21.2 |
| 3,830,006 | A * | 8/1974 | Garbolino | 43/23 |
| 3,847,193 | A * | 11/1974 | Brunstetter | 81/458 |
| 3,885,721 | A * | 5/1975 | Vanus | 224/922 |
| 3,901,298 | A * | 8/1975 | Eby | 81/455 |
| 3,964,706 | A * | 6/1976 | Adams | 43/21.2 |
| 4,050,179 | A * | 9/1977 | Johnson | 43/22 |
| 4,083,141 | A * | 4/1978 | Shedd et al. | 43/23 |
| 4,271,878 | A * | 6/1981 | Bologa | 141/375 |

(Continued)

FOREIGN PATENT DOCUMENTS

| | | | | | |
|---|---|---|---|---|---|
| GB | 2264215 | A | * | 8/1993 | ............. A01K 87/00 |
| JP | 11155426 | A | * | 6/1999 | ............. A01K 87/00 |

(Continued)

*Primary Examiner* — Darren W Ark
(74) *Attorney, Agent, or Firm* — Allen D. Hertz, P.A.; Allen D. Hertz (57) ABSTRACT

A gimbal cover is fabricated having a hollowed body with an opening at a gimbal receiving end enabling slideable insertion of a gimbal butt end into the cover. A butt end is integrated into the cover at an opposite end, providing support and protection for a bottom surface of the gimbal, while also reducing the risk of the gimbal damaging another object. At least one pair of cover slot is formed through the cover butt end, extending into the cover body towards opening. The slots terminate at a slot end. The slots are sized and shape to follow a slot and end of the gimbal butt end. A cover extension segment is created between two adjacent cover slots. A cover extension base protection segment is formed in the cover butt end, wherein the base protection segment extends inward from a base end of the gimbal cover extension segment.

20 Claims, 12 Drawing Sheets

(56) References Cited

U.S. PATENT DOCUMENTS

| | | | | |
|---|---|---|---|---|
| 4,375,731 A * | 3/1983 | Budd | | 43/21.2 |
| 4,403,439 A * | 9/1983 | Wallace | | 43/23 |
| 4,425,729 A * | 1/1984 | Miyamae | | 43/21.2 |
| 4,485,579 A * | 12/1984 | Hawie | | 43/21.2 |
| 4,520,587 A * | 6/1985 | Wallace | | 43/23 |
| 4,578,891 A * | 4/1986 | Murray | | 43/23 |
| 4,637,157 A * | 1/1987 | Collins | | 43/23 |
| 4,682,438 A * | 7/1987 | Arrow | | 43/21.2 |
| 4,688,346 A * | 8/1987 | Collins | | 43/23 |
| 4,738,046 A * | 4/1988 | Fraylick et al. | | 43/23 |
| 4,836,127 A * | 6/1989 | Wille | | 43/21.2 |
| 4,845,882 A * | 7/1989 | Collins | | 43/25 |
| 4,856,220 A * | 8/1989 | Oak et al. | | |
| 4,887,375 A * | 12/1989 | Shedd et al. | | 43/21.2 |
| 5,065,540 A * | 11/1991 | Potter, Jr. | | 43/21.2 |
| 5,129,292 A * | 7/1992 | Albert | | 81/452 |
| 5,231,782 A * | 8/1993 | Testa | | 43/18.1 R |
| 5,307,585 A * | 5/1994 | Thompson | | 43/21.2 |
| 5,355,611 A * | 10/1994 | Dahlberg et al. | | 43/25 |
| 5,522,169 A * | 6/1996 | Heller | | 43/23 |
| 5,557,875 A * | 9/1996 | Testa | | 43/23 |
| 5,564,217 A * | 10/1996 | Riedell | | 43/23 |
| 5,697,184 A * | 12/1997 | Heller | | 43/23 |
| 5,901,890 A * | 5/1999 | Stokes | | 224/406 |
| 6,116,125 A * | 9/2000 | McLeod | | 81/456 |
| 6,125,572 A * | 10/2000 | Collins | | 43/23 |
| 6,176,034 B1 * | 1/2001 | Collins | | 43/23 |
| 6,460,285 B2 * | 10/2002 | Collins | | 43/23 |
| 6,557,292 B1 * | 5/2003 | Howard | | 43/21.2 |
| 6,626,409 B1 * | 9/2003 | Thompson | | 43/21.2 |
| 7,146,763 B1 * | 12/2006 | Stanton | | 43/21.2 |
| 7,313,886 B2 * | 1/2008 | Brown et al. | | 43/23 |
| 7,415,996 B2 * | 8/2008 | Favreau | | 141/364 |
| 7,757,590 B2 * | 7/2010 | Swartz | | 81/452 |
| 7,841,124 B2 * | 11/2010 | Wegman | | 43/21.2 |
| 8,739,363 B2 * | 6/2014 | Allen | | 16/2.1 |
| 8,839,549 B2 * | 9/2014 | Baker, III | | 43/21.2 |
| 8,919,031 B2 * | 12/2014 | Malcarne | | 43/23 |
| 2005/0102881 A1 * | 5/2005 | Legendziewicz | | 43/21.2 |
| 2006/0101704 A1 * | 5/2006 | Ayoub | | 43/23 |
| 2006/0261234 A1 * | 11/2006 | Taboada | | 248/314 |
| 2006/0277813 A1 * | 12/2006 | Saldana | | 43/21.2 |
| 2007/0214706 A1 * | 9/2007 | Donato | | 43/21.2 |
| 2010/0205847 A1 * | 8/2010 | Hawley | | 43/21.2 |
| 2014/0183240 A1 * | 7/2014 | Silverman | | 224/628 |
| 2014/0259862 A1 * | 9/2014 | Malcarne | | 43/23 |
| 2014/0366427 A1 * | 12/2014 | Baker, III | | 43/21.2 |
| 2015/0000177 A1 * | 1/2015 | Liney | | 43/21.2 |

FOREIGN PATENT DOCUMENTS

| | | | | | |
|---|---|---|---|---|---|
| JP | 2001057830 A | * | 3/2001 | | A01K 87/00 |
| JP | 2001333668 A | * | 12/2001 | | A01K 87/08 |
| JP | 2002058395 A | * | 2/2002 | | A01K 87/00 |
| JP | 2011087523 A | * | 5/2011 | | A01K 87/00 |
| WO | WO 2012160351 A1 | * | 11/2012 | | A01K 97/10 |

\* cited by examiner

GIMBAL COVER AND METHOD OF USE

CROSS-REFERENCE TO RELATED APPLICATION

This Non-Provisional Utility application claims the benefit of U.S. Provisional Patent Application 61/569,767 filed on Dec. 12, 2011 and U.S. Provisional Patent Application 61/528,162 filed on Aug. 27, 2011, both of which are incorporated herein in their entireties.

FIELD OF THE INVENTION

The present invention relates to a gimbal cover and method of use, and more particularly, a gimbal cover comprising a hollowed body having an insertion opening and a plurality of gimbal cover extension segments shaped and sized to cover a gimbal of a fishing or boating apparatus or other similar butt end configuration without interfering with a gimbal pin.

BACKGROUND OF THE INVENTION

Gimbals are provided on a support end of an apparatus, such as a fishing rod, a dock power cable retainer, a tripod rod holder assembly, and the like. The gimbal is shaped into an end of the primary shaft of the apparatus, wherein the gimbal is a pivotal support that allows the rotation of the object about a single axis. The exemplary apparatuses can include a single slot or a pair of slots oriented at a right angle to one another.

The gimbal is commonly fabricated of a solid, dense material, such as machined or cast metal. The material is generally heavy, where if the item were to be accidentally dropping, the gimbal has a high probability of damaging the surface it would land upon. If the object were dropped upon a rough or dense surface, such as concrete, metal, and the like, the gimbal could be scratched, dented, become cracked, or subjected to other damage.

Accordingly, there remains a need in the art for a device, which protects the gimbal from damage as well as other items from being damaged by the gimbal.

SUMMARY OF THE INVENTION

The present invention overcomes the deficiencies of the known art and the problems that remain unsolved by providing a method and respective apparatus for covering a gimbal.

In accordance with one embodiment of the present invention, the invention consists of a gimbal cover comprising:
a gimbal cover body comprising a hollowed interior formed within a tubular sidewall terminating at a gimbal cover butt end, wherein the interior is accessible through a gimbal receiving end terminating at a receptacle base;
at least one pair of gimbal slots are provided through the butt end and sidewall, where each gimbal slot is located opposite a mating gimbal slot;
wherein the hollowed interior has a circumference sized and shaped to mate with a gimbal of an apparatus, and
the at least one pair of gimbal slots are sized and shaped to outline a respective pair of slots of the gimbal.

In a second aspect, the gimbal cover further comprises two pair of gimbal slots.

In another aspect, the gimbal cover further comprises two pair of gimbal slots, the pairs are disposed at right angles to one another In yet another aspect, the gimbal slots comprise a pair of side sidewalls. The sidewalls can be parallel to each other or angled, having a wider span therebetween proximate a base section and converge as the sidewalls approach the slot end.

In yet another aspect, the end wall is rounded.

In yet another aspect, the gimbal cover receptacle is defined having a circular interior peripheral shape.

In yet another aspect, the gimbal cover further comprises a pliant interior surface for adapting to an exterior surface of the apparatus gimbal.

In yet another aspect, the gimbal cover is slideably attached to a gimbal butt end of a fishing rod.

In yet another aspect, the gimbal cover is slideably attached to a gimbal butt end of a dock power cable retainer.

In yet another aspect, the gimbal cover is slideably attached to a gimbal butt end of a tripod rod holder assembly.

In yet another aspect, the gimbal cover is fabricated of an impact absorbing material.

In yet another aspect, the gimbal cover is fabricated of a natural and/or synthetic rubber material.

In yet another aspect, the gimbal cover is fabricated of a plastic material.

In yet another aspect, the gimbal cover is fabricated of a nylon material.

In yet another aspect, the gimbal cover is fabricated of an acetal or an acetal polyoxymethylene resin material.

In yet another aspect, the gimbal cover is fabricated of a composite material comprising a woven base embedded within a resin. Examples include fiberglass, carbon fiber, and the like.

And with another aspect, a method of use includes the steps of:
obtaining a gimbal cover, the gimbal cover comprising:
a gimbal cover body comprising a hollowed interior formed within a tubular sidewall terminating at a gimbal cover butt end, wherein the interior is accessible through a gimbal receiving end terminating at a receptacle base;
a gimbal cover receptacle base extending inward from said gimbal cover butt end of said tubular sidewall providing a surface for engaging with a butt end of a gimbal;
at least one pair of gimbal slots are provided through the butt end and sidewall, where each gimbal slot is located opposite a mating gimbal slot;
wherein the hollowed interior has a circumference sized and shaped to mate with a gimbal of an apparatus, and the at least one pair of gimbal slots are sized and shaped to outline a respective pair of slots of the gimbal;
sliding the gimbal cover onto the apparatus gimbal wherein the exterior of a plurality of gimbal projections, while coinciding with a slot sidewall and slot end wall provided between adjacent gimbal projections, thus enabling a gimbal pin to seat against the gimbal end wall.

In yet another aspect, the method further comprises a step of rotating the gimbal cover to align the gimbal cover slots with the object gimbal slots.

In yet another aspect, the method further comprises a step of rotating the gimbal cover to align the gimbal cover slot sidewalls with the object gimbal slot sidewalls.

In yet another aspect, the method further comprises a step of sliding the gimbal cover onto the object gimbal butt end until the object gimbal end surface abuts the gimbal cover receptacle base.

In yet another aspect, the method further comprises a step of inserting an object comprising the gimbal cover into a gimbal receptacle assembly comprising a gimbal pin, wherein the gimbal slot is oriented straddling the gimbal pin. The gimbal slot end rests against the gimbal pin.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

Figure 1:
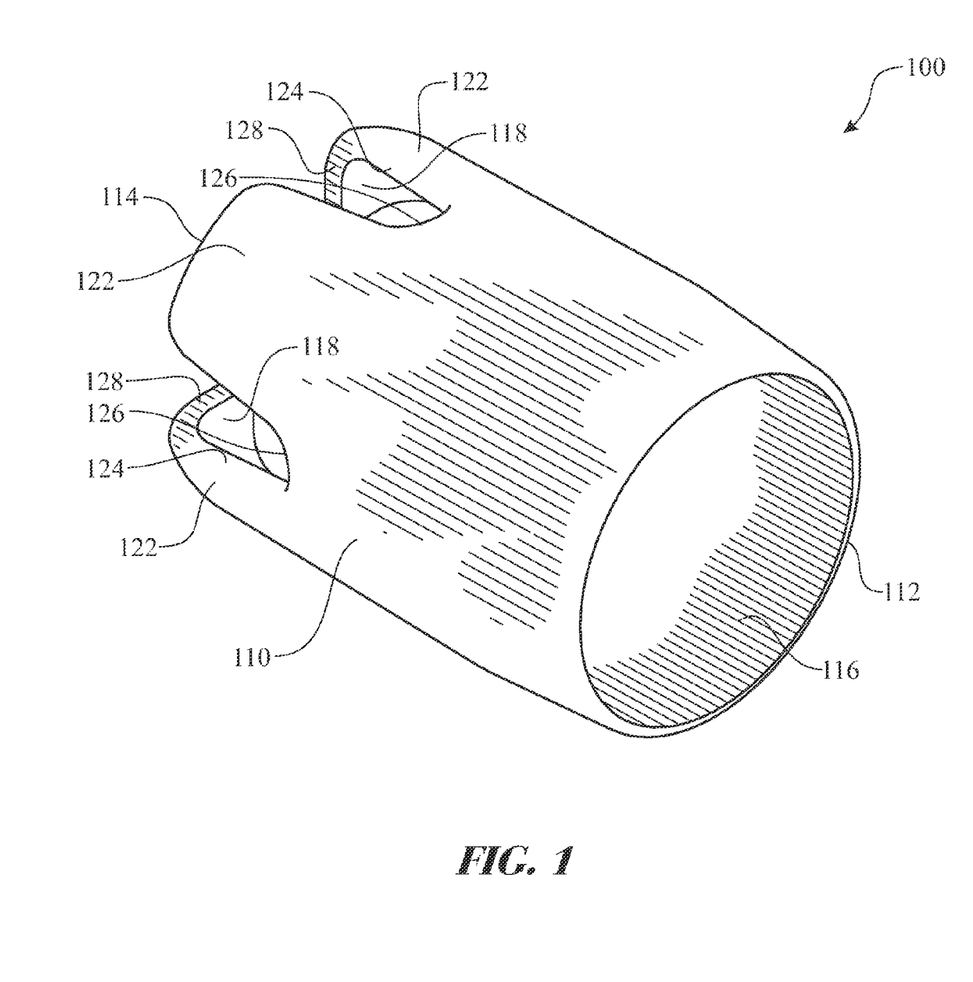
FIG. 1 presents a top isometric view of a first exemplary gimbal cover.
Figure 2:
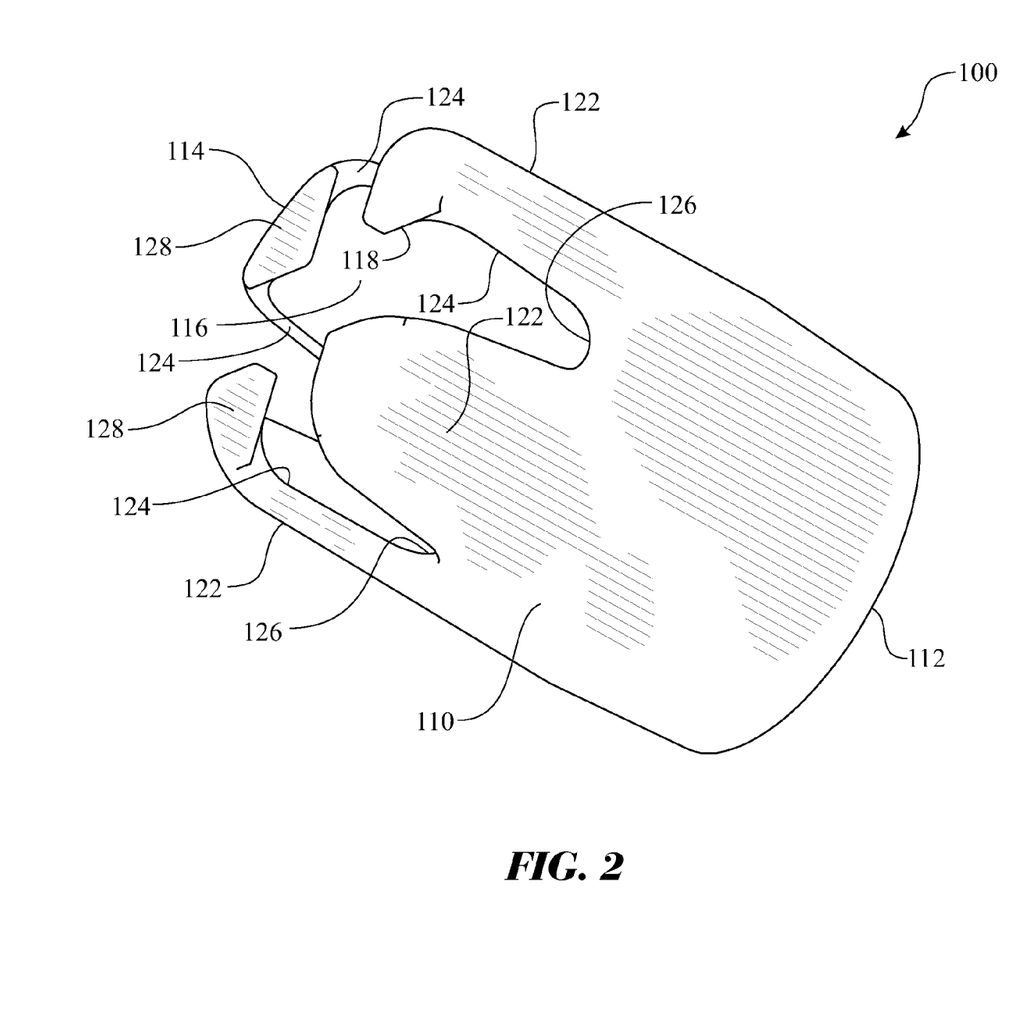
FIG. 2 presents a bottom isometric view of the exemplary gimbal cover originally introduced in FIG. 1.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

A dual slot gimbal cover 100 is presented in FIGS. 1 through 6. The dual slot gimbal cover 100 is fabricated having a series of gimbal cover extension segment 122 extending from a distal end of a tubular shaped gimbal cover body 110. The gimbal cover body 110 defines a gimbal cover receptacle 116 accessible through a gimbal receiving end 112. A gimbal cover extension base protection segment 128 is provided at the end opposite from the gimbal receiving end 112. A slot is provided between adjacent ends of the gimbal cover extension base protection segment 128, wherein the slot is defined by a pair of gimbal cover slot 124 terminated at a gimbal cover slot end 126. The slot initiates through the gimbal cover extension base protection segment 128 and continues into the gimbal cover body 110, wherein a pair of adjacent slots forms a gimbal cover extension segment 122. The dual slot gimbal cover 100 can include one pair of slots (presented as a single slot gimbal cover 102, illustrated in FIG. 11) or two pair of slots (as illustrated). Each slot of the pair of slots is preferably located opposite a mating slot. A gimbal cover receptacle base 118 is provided on an interior surface of the gimbal cover extension base protection segment 128. A gimbal cover butt end 114 is defined by an exterior surface of the gimbal cover extension base protection segment 128. The gimbal cover extension base protection segment 128 is provided to protect surfaces when an apparatus comprising the dual slot gimbal cover 100 is accidentally dropped thereon. The gimbal cover extension base protection segment 128 also protects the surface, corners, and overall integrity of the gimbal end of the apparatus when the dual slot gimbal cover 100 is accidentally dropped upon a surface, inserted into a gimbal receptacle assembly, and the like.

Figure 3:
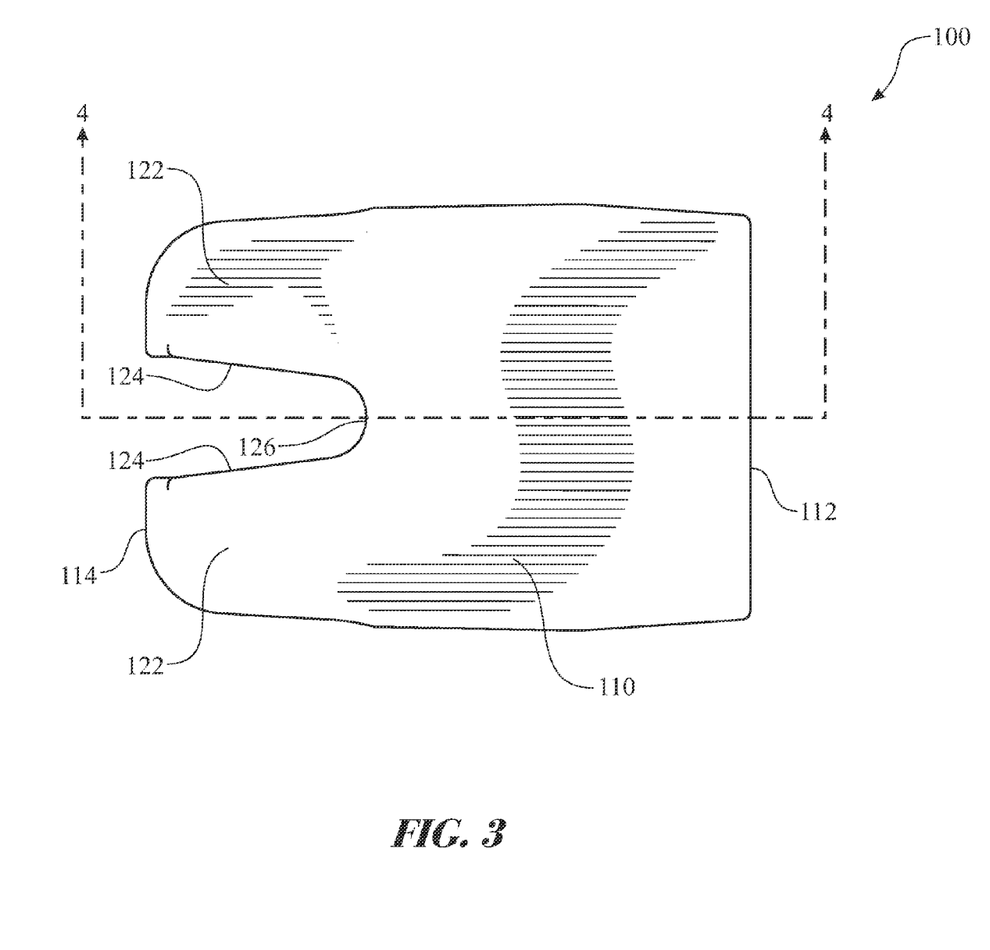
FIG. 3 presents a side elevation view of the exemplary gimbal cover originally introduced in FIG. 1.
Figure 4:
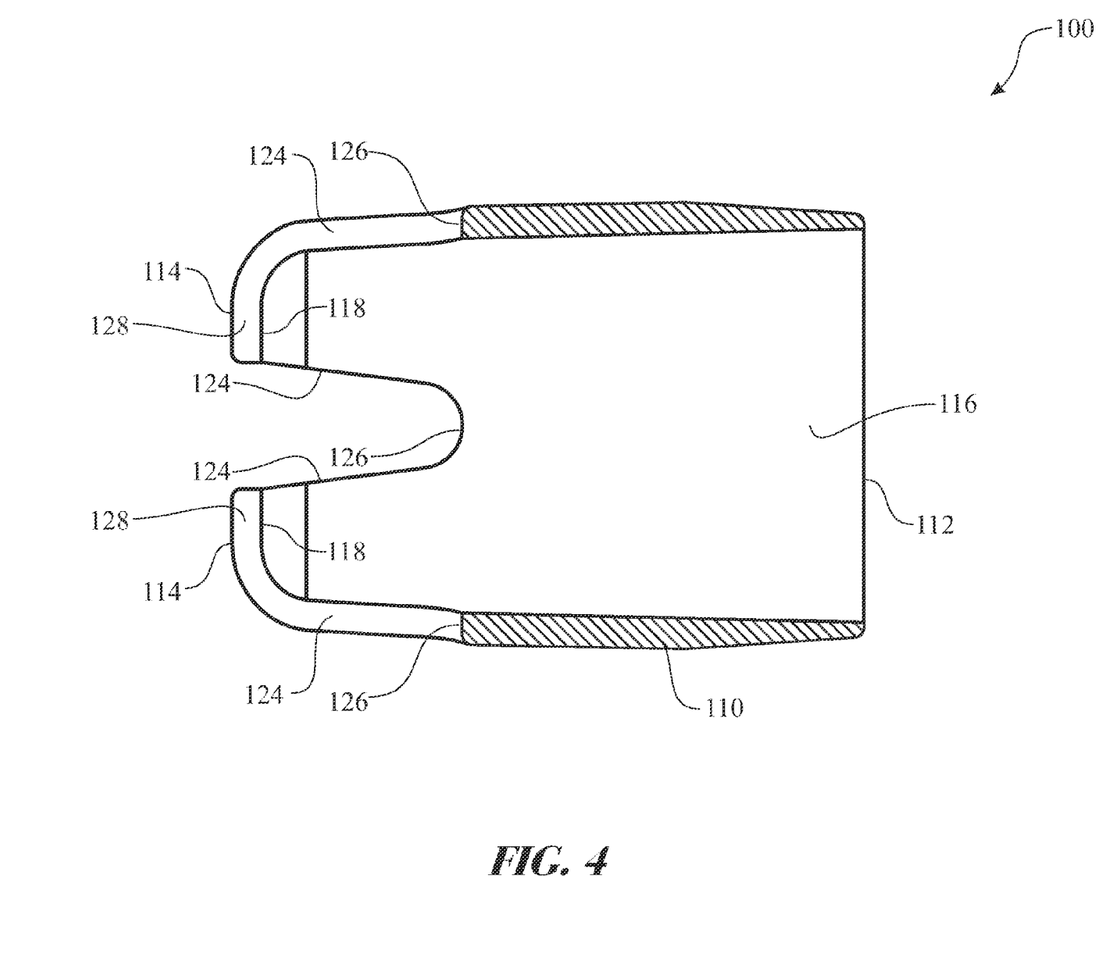
FIG. 4 presents a sectioned side elevation view of the exemplary gimbal cover originally introduced, the section begin taken along section line 4-4 of FIG. 3.
Figure 5:
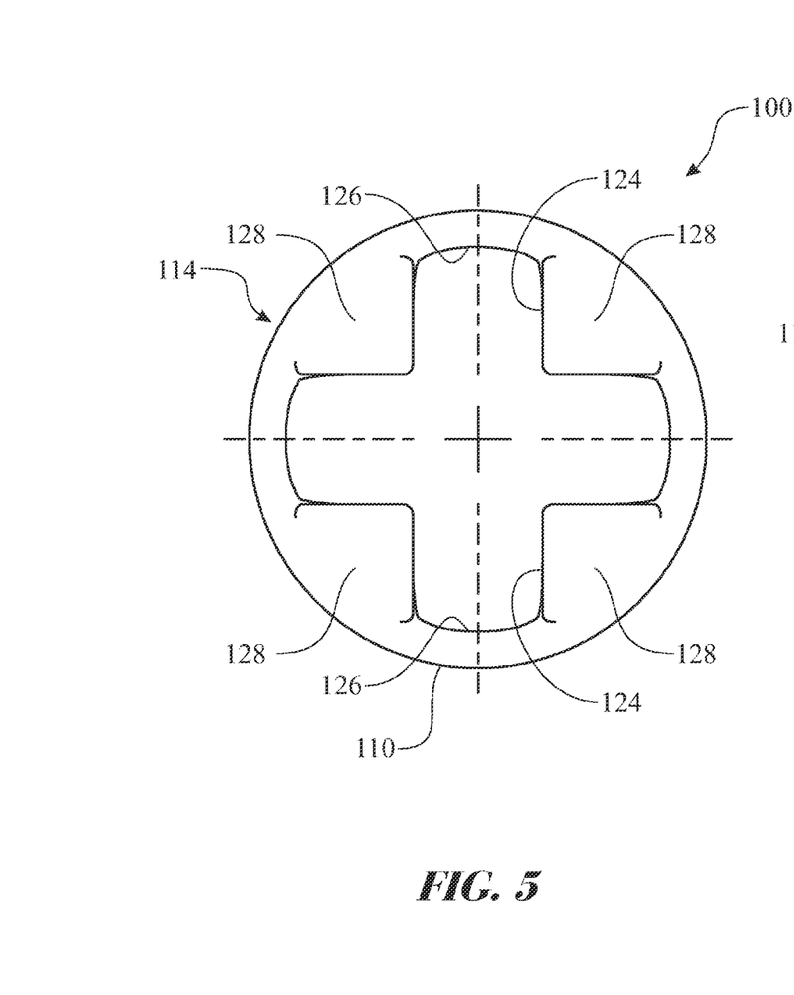
FIG. 5 presents a base end view of the exemplary gimbal cover originally introduced in FIG. 1.
Figure 6:
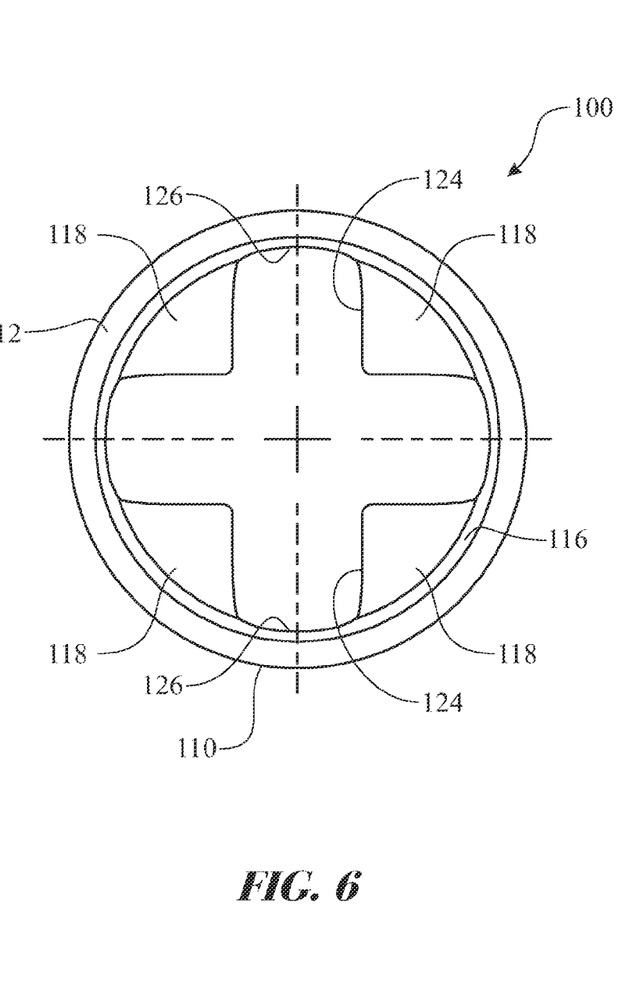
FIG. 6 presents a top insertion end view of the exemplary gimbal cover originally introduced in FIG. 1.
Figure 7:
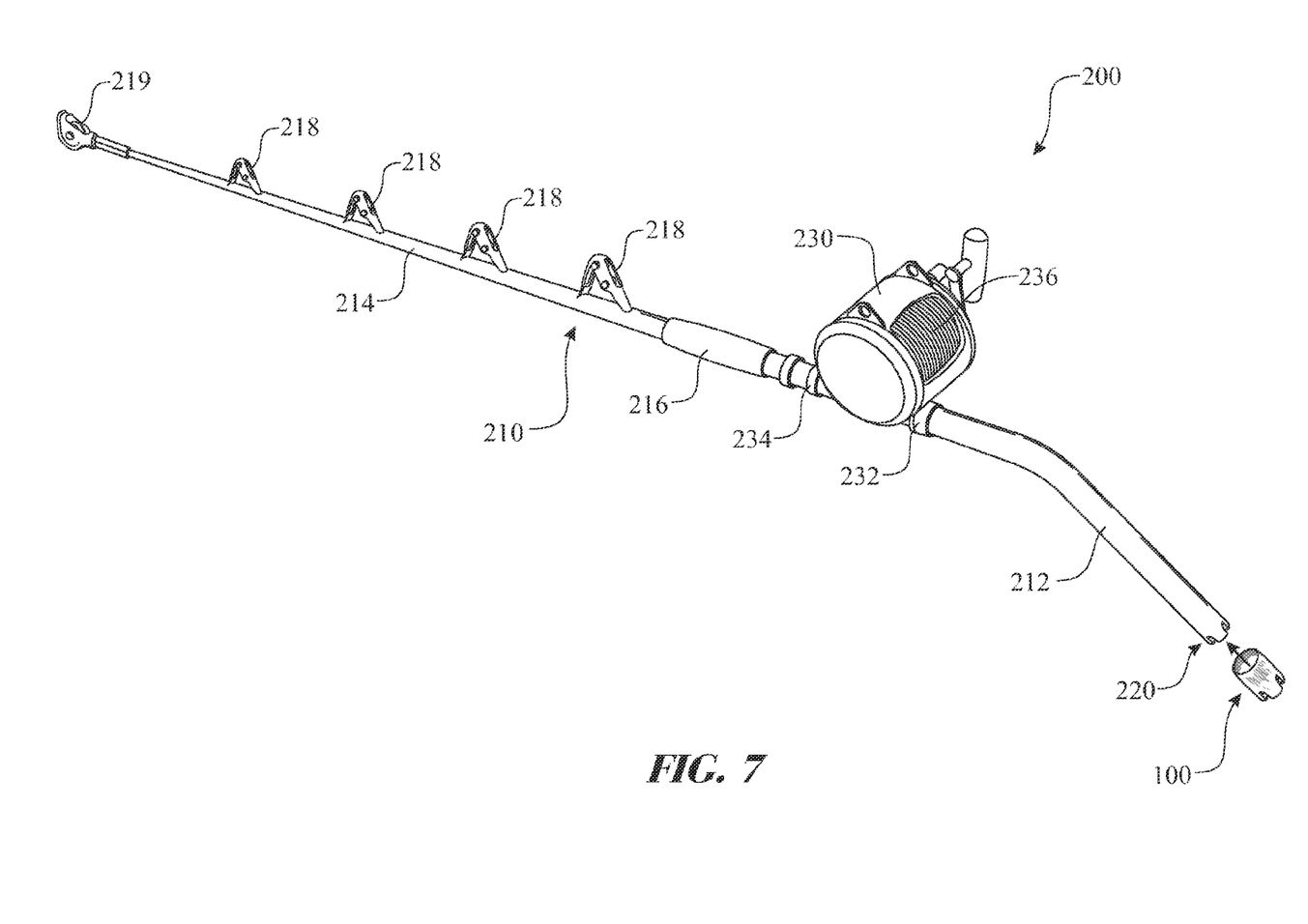
FIG. 7 presents an isometric view of an exemplary fishing rod having the gimbal cover being assembly thereto.
Figure 8:
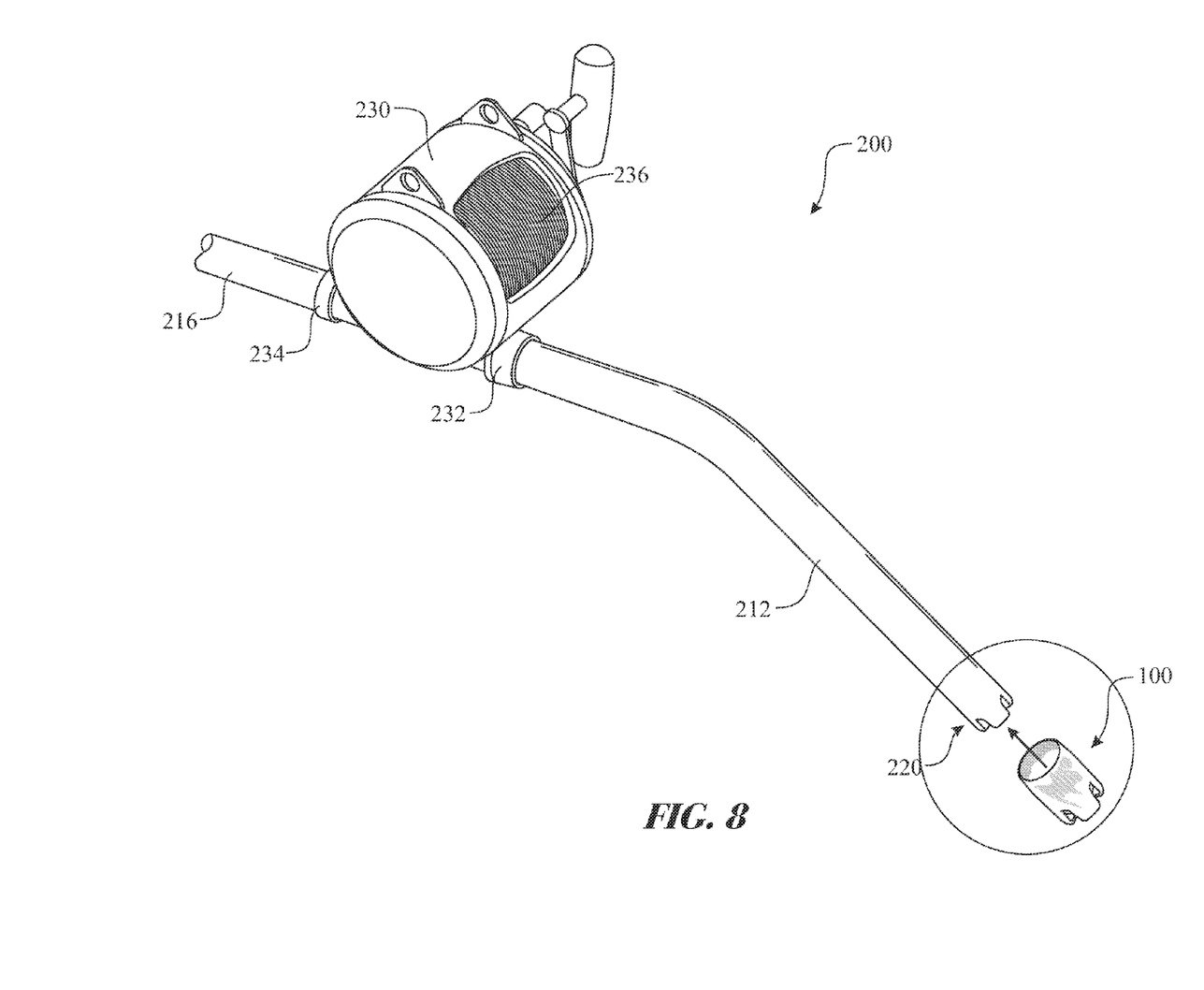
FIG. 8 presents an enlarged isometric view of a butt end portion of the exemplary fishing rod having the gimbal cover being assembly thereto.
Figure 11:
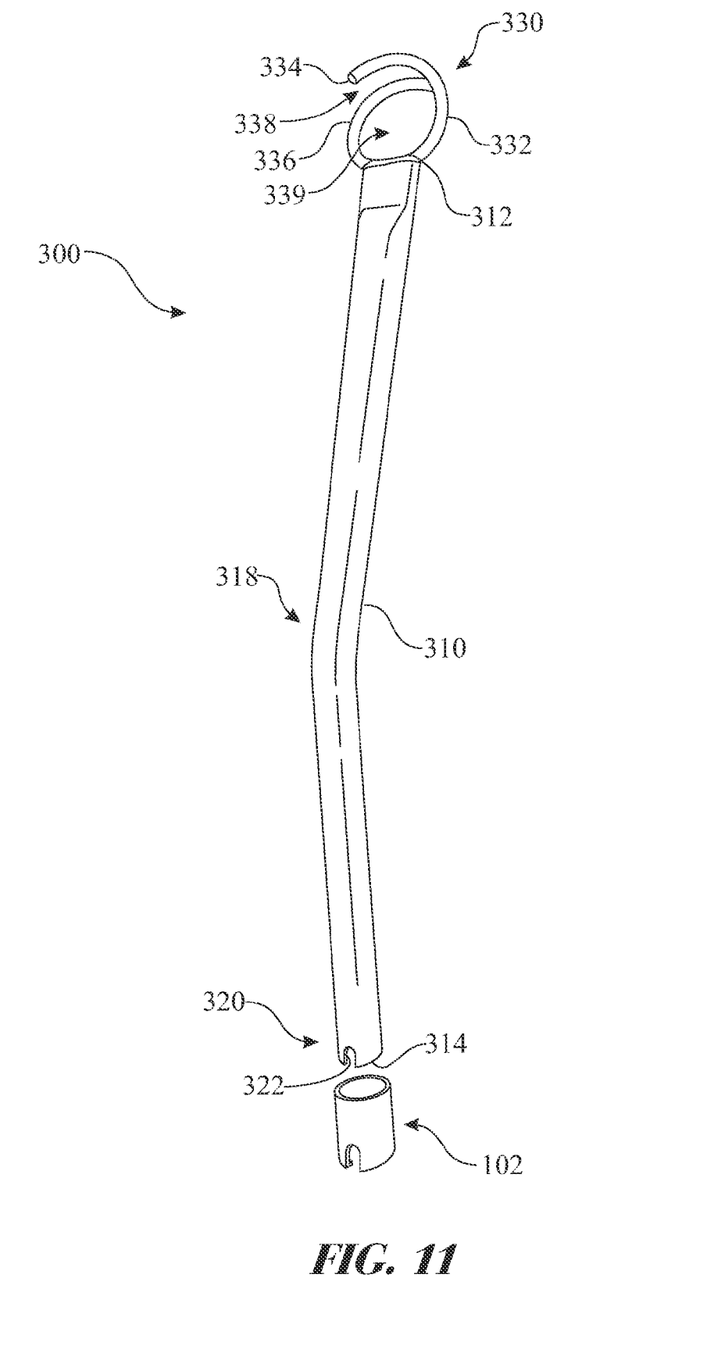
FIG. 11 presents an isometric view of an exemplary dock power cable retainer comprising a gimbal end and a respective gimbal cover being assembled thereto.
Figure 12:
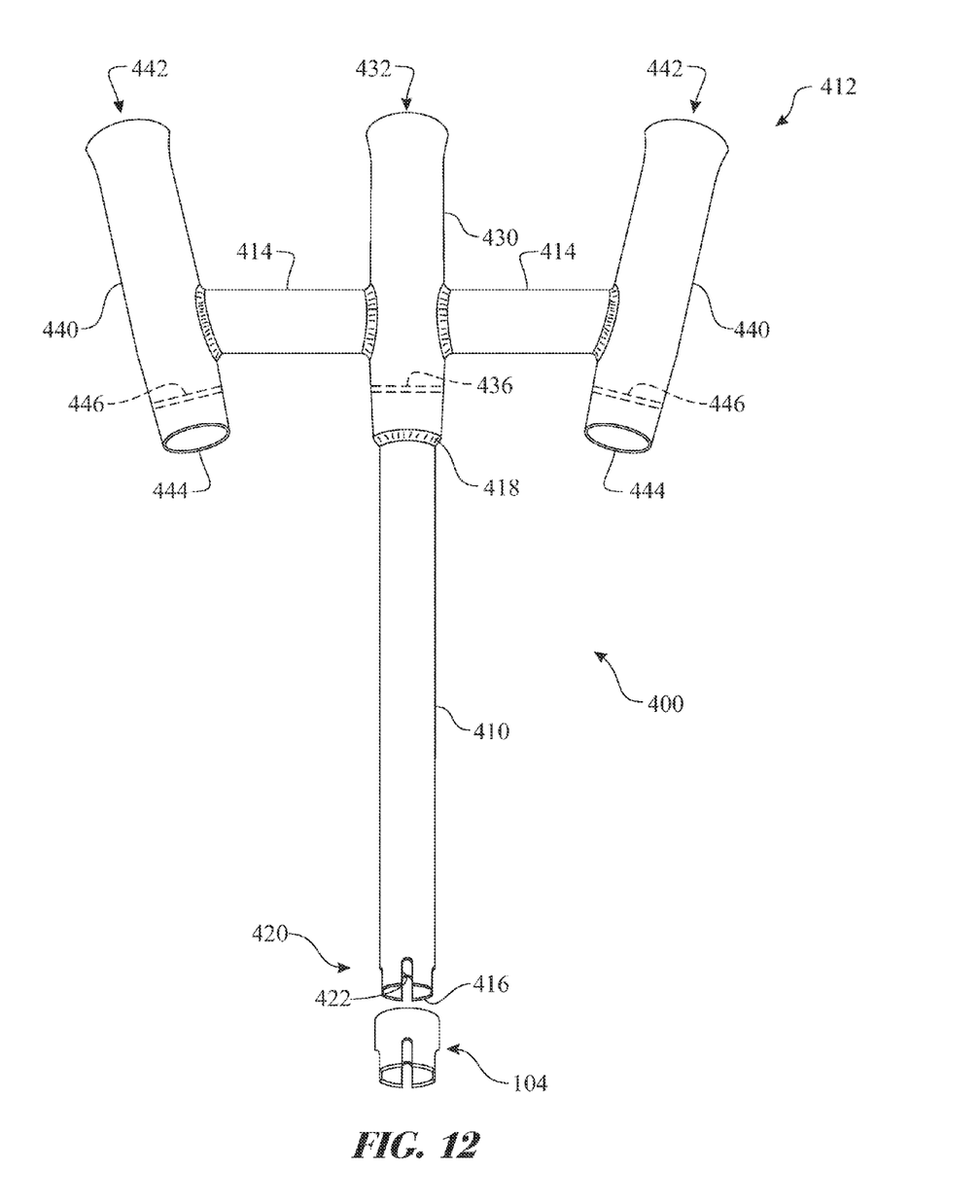
FIG. 12 presents an isometric view of an exemplary tripod rod holder assembly comprising a gimbal end and a respective gimbal cover being assembled thereto.

The gimbal cover slot 124 are preferably sized and shaped to adhere to a contour of a respective slot of a desired gimbal end of an object. The gimbal cover slot 124 is sized and shaped to ensure the dual slot gimbal cover 100 does not interfere with the operation of the gimbal end of the object. The gimbal cover extension base protection segment 128 includes one or two slots, enabling a gimbal pin 546 (FIG. 13) to pass through the gimbal cover extension base protection segment 128 and continue sliding upwards until the gimbal pin 546 contacts the gimbal cover slot end 126. The gimbal cover slot 124 for each respective slot can be parallel to each other (as illustrated in FIGS. 11 and 12) or angled (as illustrated in FIG. 3), having a wider span therebetween proximate a base section and converge as the sidewalls approach the slot end. It is desired that the gimbal cover slot end 126 is rounded or arched.

The dual slot gimbal cover 100 is fabricated of an impact absorbing material, such as plastic, natural rubber, synthetic rubber, nylon, acetal, acetal polyoxymethylene resin, Polyvinylchloride (PVC), a composite material comprising a woven base embedded within a resin, and the like.

Figure 13:
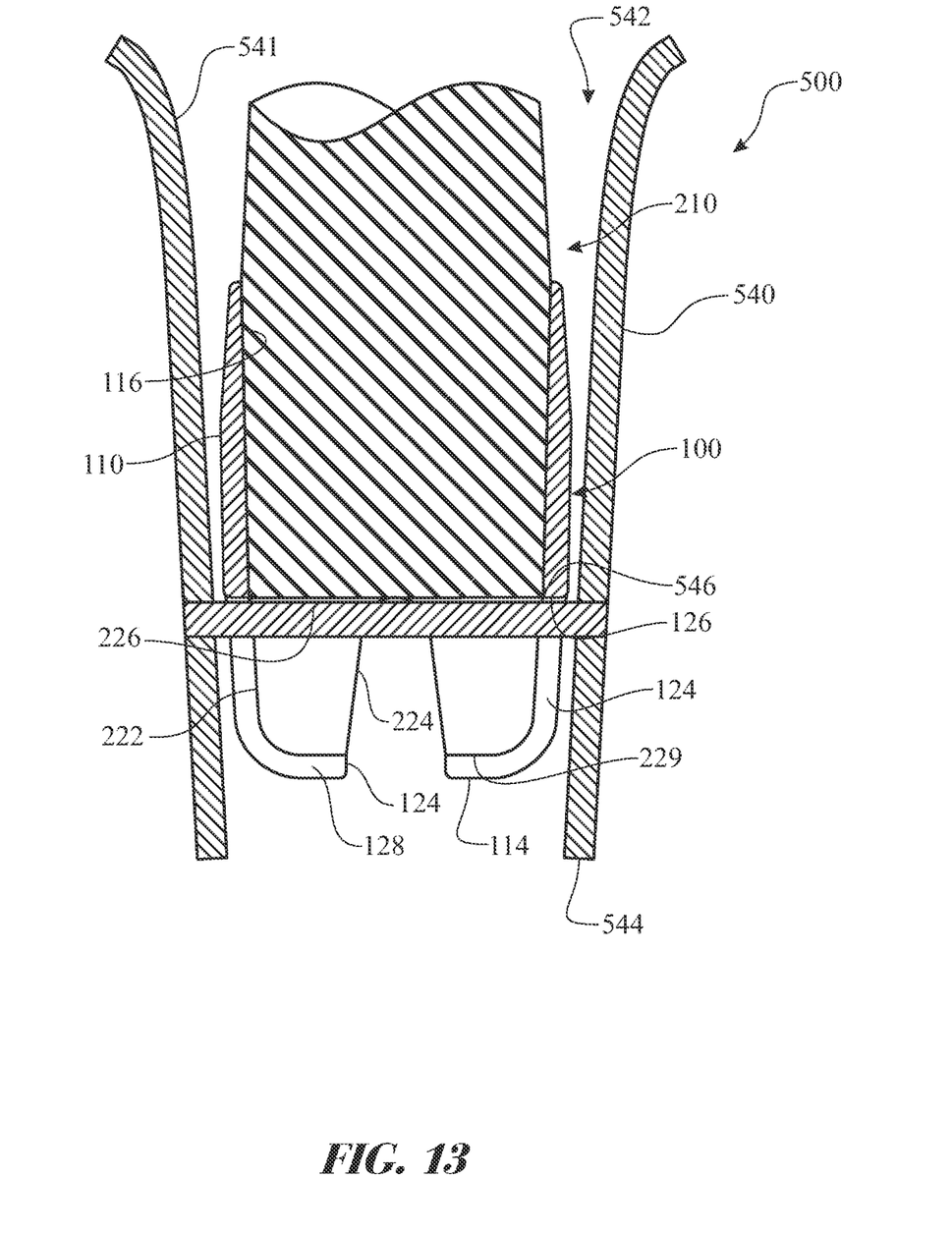
FIG. 13 presents a sectioned side view of a protected gimbal inserted into an exemplary gimbal receptacle assembly.

The dual slot gimbal cover 100 can be installed upon any object comprising a gimbal end. A first example is a fishing rod assembly 200, which is illustrated in FIGS. 7 through 10. The exemplary fishing rod assembly 200 includes a fishing rod 210 sectioned into a butt end 212 and a flexible fishing rod section 214. The butt end 212 and flexible fishing rod section 214 can be provided as two segments joined by a separable interface or as a single, unitary element. The butt end 212 can be linear or curved (as illustrated). A fishing reel 230 is removably attached to the fishing rod 210 by a reel seat. The reel seat includes a rear reel seat 232 (which remains fixed)

and an adjustable real clamp 234, which adjusts to secure and release the fishing reel 230. The reel seats are often fabricated of graphite-reinforced plastic, aluminum, wood, and the like to provide sufficient support for the fishing reel 230. The fishing reel 230 winds and releases fishing line 236. The fishing reel 230 is available in a variety of form factors. A series of main line guides 218 are assembled to the flexible fishing rod section 214 in a linear spatial arrangement. The main line guides 218 can be assembled in an equidistance linear spatial arrangement if desired. A tip line guide 219 is carried by a distal end of the flexible fishing rod section 214. In use, the fishing line 236 can be threaded through the series of main line guides 218, continuing through the tip line guide 219, where tackle is then attached to an end of the fishing line 236. A gimbal butt end 220 is provided at a base end of the butt end 212 for engagement with a gimbal pin 546 of a gimbal receptacle assembly 500, as illustrated in FIG. 13. An optional hand grip 216 can be assembled to the flexible fishing rod section 214, enhancing an area for the user to grip the fishing rod assembly 200.

Figure 9:
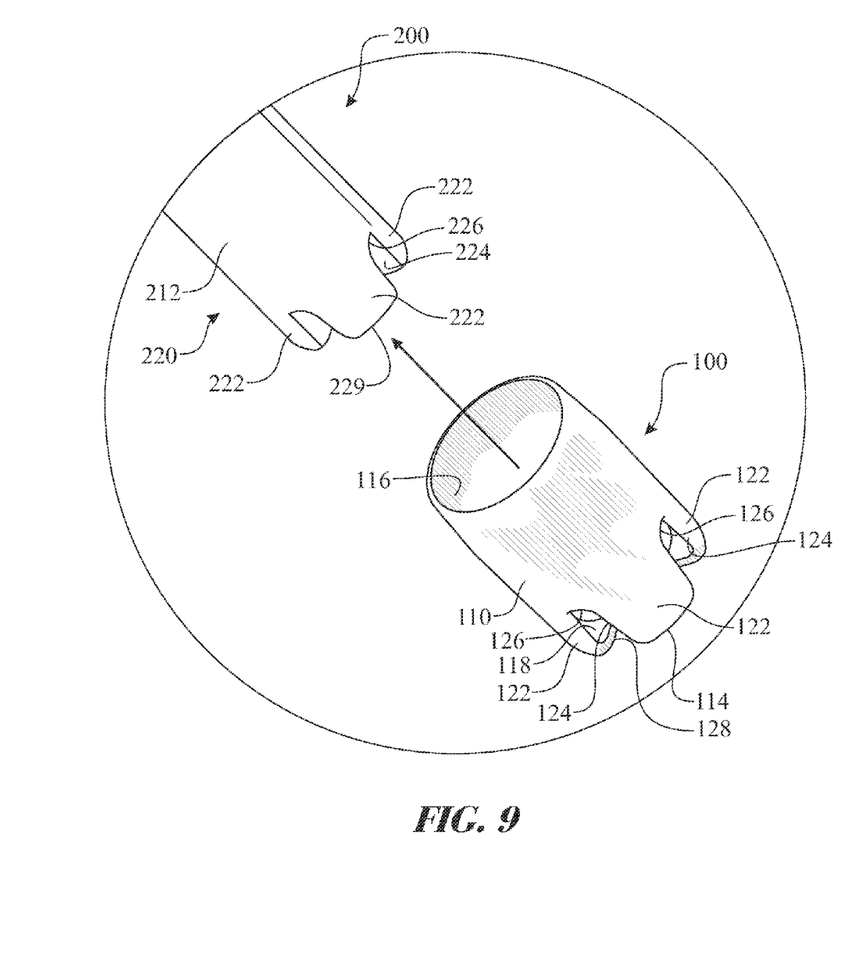
FIG. 9 presents an enlarged, detailed isometric view of a gimbal butt end of the exemplary fishing rod having the gimbal cover being assembly thereto.
Figure 10:
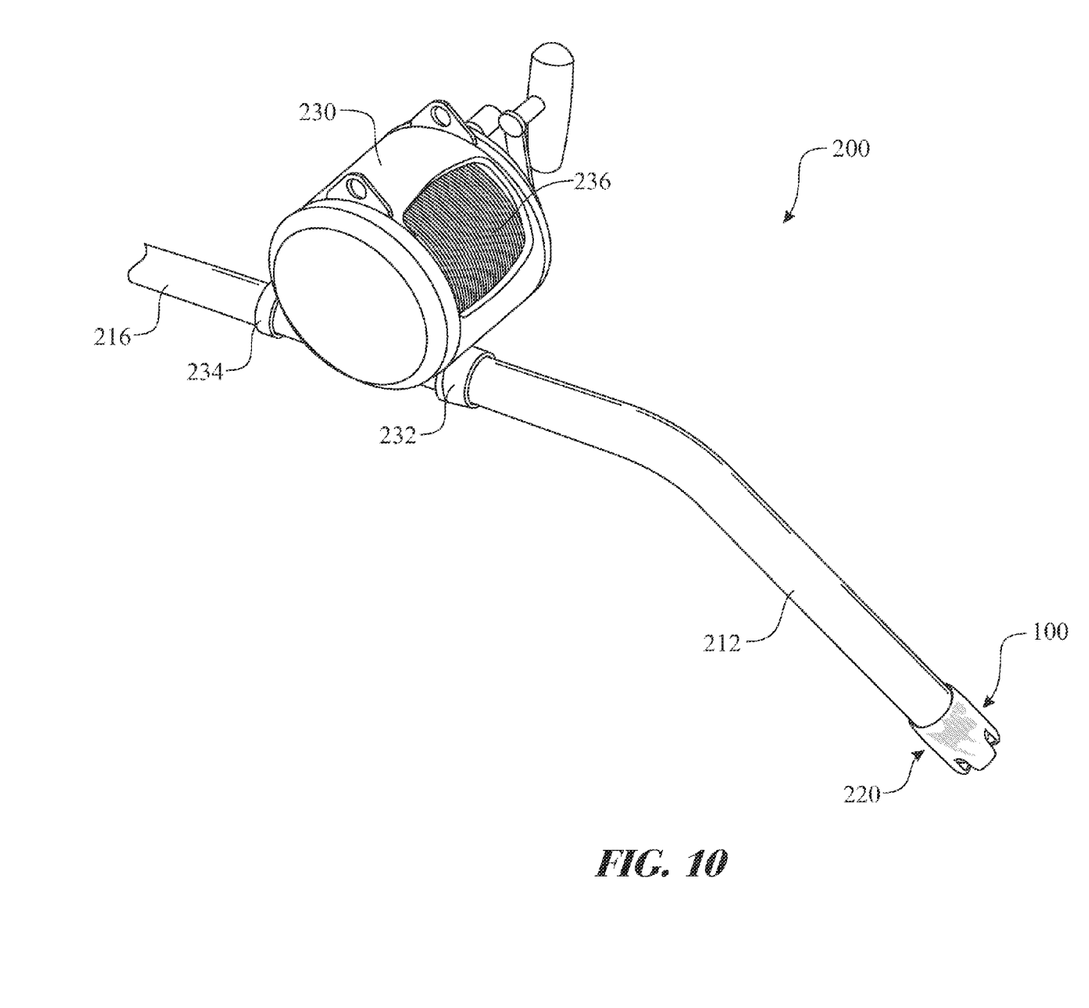
FIG. 10 presents an enlarged isometric view of the butt end portion of the exemplary fishing rod, as presented in FIG. 9, having the gimbal cover assembled thereto.

Details of the gimbal butt end 220 are presented in FIG. 9. The gimbal butt end 220 includes one or two slots forming two or four gimbal projections 222. It is preferred that each of the gimbal projections 222 are equally shaped and sized with the other gimbal projections 222. In the configuration comprising a pair of slots, the slots are preferably oriented at a right angle to one another. The exemplary embodiment includes a pair of slots. Each slot is fabricated having a pair of gimbal slot sidewalls 224 terminating at a gimbal slot end wall 226. The slot preferably passes through a concentric central location of the gimbal butt end 220. The gimbal slot sidewall 224 for each respective slot can be parallel to each other (as best illustrated in FIGS. 10 and 11) or angled (as illustrated in FIGS. 9 and 13), having a wider span therebetween proximate a base section and converge as the sidewalls approach the slot end. It is desired that the gimbal cover slot end 126 is arched. An end of the gimbal butt end 220 is defined as a gimbal end surface 229.

The dual slot gimbal cover 100 is slideably assembled onto the gimbal butt end 220 as illustrated in FIGS. 7 through 10. A lubricant, such as soap, may be utilized to aid in the assembly process. Over a short period of time, the soap dries, retaining the dual slot gimbal cover 100 in position. The dual slot gimbal cover 100 is slide onto the gimbal butt end 220 until the gimbal end surface 229 seats against the gimbal cover receptacle base 118 or other stop feature included within the gimbal cover receptacle 116. The dual slot gimbal cover 100 is rotated, aligning the gimbal cover slot 124 with the gimbal slot sidewall 224.

The dual slot gimbal cover 100 can be adapted for use with other marine hardware comprising a gimbal base for insertion into a gimbal receptacle assembly 500. A first alternate application of the dual slot gimbal cover 100 is a single slot gimbal cover 102 being assembled onto a guide body gimbal end 320 of a dock power cable retainer 300, as illustrated in FIG. 11. The dock power cable retainer 300 is inserted into a gimbal receptacle assembly 500 of an aquatic vessel, wherein the dock power cable retainer 300 supports and retains various objects, including power cables, mooring lines, and the like. A retaining ring 330 is affixed to a guide column retainer end 312 of a guide retainer support column 310. A guide body gimbal end 320 is formed at an opposite or guide column base end 314 of the guide retainer support column 310. The guide retainer support column 310 is preferably fabricated of a tubular, non-corrosive material, such as aluminum. The retaining ring 330 is preferably fabricated of a compatible material for assembly. In the exemplary embodiment, the retaining ring 330 is fabricated of aluminum and affixed to the guide column retainer end 312 of the guide retainer support column 310 using common welding techniques. It is understood that the retaining ring 330 can be assembled to the guide column retainer end 312 using any mechanical fastening techniques suitable for the application and environment. A body arch 318 can be formed at a position along a length of the guide retainer support column 310 as desired.

The retaining ring 330 can be fabricated in any shape for the desired function. In the exemplary embodiment, the retaining ring 330 is fabricated of a coiled round-bar material. The round-bar is shaped having a first ring segment 332 and a second ring segment 336. The free end of each ring segment 332, 336 is a ring segment end 334. A ring segment gap 338 is provided between overlapping portions of the ring segments 332, 336, enabling an object to pass through the ring segments 332, 336 and into the retaining loop 339. The ring segments 332, 336 support and retain the object therein. Those skilled in the art can appreciate utilizing an apparatus having a different configuration while maintaining the desired function of the exemplary retaining ring 330.

The guide body gimbal end 320 includes features similar to the gimbal butt end 220. The exemplary embodiment includes a pair of guide body gimbal slot 322, wherein each guide body gimbal slot 322 is located across from the other. It is understood that one guide body gimbal slot 322 would be included if the guide retainer support column 310 were fabricated of a solid material. The pair of guide body gimbal slot 322 (or single guide body gimbal slot 322 for a solid column) is located having a gimbal pin interface passing through a concentric point of the cross sectional shape of the guide retainer support column 310.

The single slot gimbal cover 102 is designed wherein the general features adhere to the size and shape of the guide body gimbal end 320. The features of the single slot gimbal cover 102 are designed to ensure the functionality of the guide body gimbal end 320 remains unencumbered.

A second alternate application of the dual slot gimbal cover 100 is a dual slot gimbal cover 104 being assembled onto a tripod column gimbal end 420 of a tripod rod holder assembly 400, as illustrated in FIG. 12. The tripod rod holder assembly 400 is inserted into a gimbal receptacle assembly 500 of an aquatic vessel, wherein the tripod rod holder assembly 400 supports and retains up to three fishing rods or other items having a gimbal butt end. A tripod head assembly 412 is affixed to an upper end of a tripod support column 410. A tripod column gimbal end 420 is formed at an opposite or tripod support column base end 416 of the tripod support column 410. The tripod support column 410 is preferably fabricated of a tubular, non-corrosive material, such as aluminum. The tripod head assembly 412 is preferably fabricated of a compatible material for assembly. In the exemplary embodiment, the tripod head assembly 412 is fabricated of aluminum and affixed to the upper end of the tripod support column 410 using a tripod head interface 418 using common welding techniques. It is understood that the tripod head interface 418 can be any mechanical fastening technique suitable for the application and environment. The tripod support column 410 can include a bend similar to the body arch 318 of the dock power cable retainer 300 to orient the tripod head assembly 412 at a desired angle to optimize the functionality thereof.

The tripod head assembly 412 can be fabricated in any shape for the desired function, and include any reasonable number of rod holders 430, 440. In the exemplary embodiment, the tripod head assembly 412 includes a central rod holder 430 and a pair of outrigger rod holders 440. The central rod holder 430 is fabricated of a tubular material comprising a flared upper end and a converged lower end. An interior of the central rod holder 430 defines a central rod holder receptacle 432. A central rod holder gimbal pin 436 is located centrally passing through the central rod holder receptacle 432 near a lower end of the central rod holder 430. Similarly, each outrigger rod holder 440 is fabricated of a tubular material comprising a flared upper end and a converged lower end. An interior of the outrigger rod holder 440 defines an outrigger rod holder receptacle 442. An outrigger rod holder gimbal pin 446 is located centrally passing through the outrigger rod holder receptacle 442 near a lower end of the outrigger rod holder 440. A tripod outrigger support beam 414 is provided connecting each respective outrigger rod holder 440 to the central rod holder 430. The tripod outrigger support beam 414 is preferably fabricated of a tubular material. One end of the tripod outrigger support beam 414 is affixed to the central rod holder 430 and the second end supports the outrigger rod holder 440. The outrigger rod holder 440 may be oriented having an angled relation with the central rod holder 430 as illustrated. This directs separation of the rod tips during use. The assembly of the components can be accomplished using any of many known assembly techniques, including welding, mechanical assembly, adhesive bonding, and the like.

The tripod column gimbal end 420 includes features similar to the gimbal butt end 220. The exemplary embodiment includes two pairs of tripod column gimbal slot 422, wherein each tripod column gimbal slot 422 of each pair is located across from the other. It is understood that two tripod column gimbal slot 422 would be included if the tripod support column 410 were fabricated of a solid material. The pair of guide body gimbal slot 322 (or single guide body gimbal slot 322 for a solid column) is located having a gimbal pin interface passing through a concentric point of the cross sectional shape of the guide retainer support column 310.

The single slot gimbal cover 102 is designed wherein the general features adhere to the size and shape of the guide body gimbal end 320. The features of the single slot gimbal cover 102 are designed to ensure the functionality of the guide body gimbal end 320 remains unencumbered. The gimbal butt end 220 is inserted into any of the rod holder receptacles 432, 442, seating the gimbal slot end wall 226 against the gimbal pins 436, 446.

A cross sectional view of a covered gimbal butt end inserted within an exemplary gimbal receptacle assembly 500 is illustrated in FIG. 13. The gimbal receptacle assembly 500 is fabricated having a gimbal receptacle sleeve 540. The gimbal receptacle sleeve 540 includes a gimbal receptacle sleeve interior surface 541, where the gimbal receptacle sleeve interior surface 541 defines a gimbal receptacle 442. A gimbal pin 546 spans across a lower portion of the gimbal receptacle 442, providing a seat for the gimbal slot end wall 226. The dual slot gimbal cover 100 protects the gimbal butt end 220 during insertion of the fishing rod 210 into the gimbal receptacle assembly 500. The gimbal slot sidewall 224 of the respective slot directs the gimbal pin 546 towards the gimbal slot end wall 226, particularly where the gimbal slot sidewall 224 are tapered. Commonly, the gimbal cover butt end 114 is positioned within the gimbal receptacle 442, where the gimbal cover butt end 114 does not extend beyond a sleeve lower edge 544 of the gimbal receptacle assembly 500. It is understood that in certain configurations, the gimbal cover butt end 114 may extend beyond the sleeve lower edge 544, where the dual slot gimbal cover 100 provides additional protection to the gimbal butt end 220. The gimbal receptacle assembly 500 can be exemplary of any gimbal receptacle assembly, including a fishing rod holder, a fighting belt, an outrigger receptacle, and the like.

Although the examples presented herein are directed towards a fishing rod assembly 200, a dock power cable retainer 300 and a tripod rod holder assembly 400, it is understood that the dual slot gimbal cover 100 can be adapted to any gimbal butt end of any object. The dual slot gimbal cover 100, 102, 104 would be designed respective to the application, and would include a body, a plurality of slots defining a matching number of extension segment covers, and a base protection segment for each respective extension segment cover.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A gimbal cover adapted for covering a gimbal located at a butt end of a shaft, the gimbal cover comprising:
    a gimbal cover body comprising a hollowed interior formed within a tubular sidewall terminating at a gimbal cover butt end;
    a gimbal cover receptacle base protection segment formed as a cantilevered flat member, extending radially inward from said gimbal cover butt end of said tubular sidewall, said gimbal cover receptacle base protection segment having an interior surface adapted to contact and cover the gimbal at the butt end of the shaft;
    at least one pair of gimbal slots is provided through said gimbal cover butt end and extending through and along said sidewall, where a first gimbal slot of said at least one pair of gimbal slots is located opposite a second gimbal slot of said at least one pair of gimbal slots, said at least one pair of gimbal slots comprising a base slot extending radially across the gimbal cover butt end which connects the first and second gimbal slots so as to allow communication therebetween, each of said first and second gimbal slots extending upwards away from the gimbal cover butt end and the base slot along the sidewall of the gimbal cover body, each of the first and second gimbal slots terminating at gimbal cover slot ends, each of the first and second gimbal slots defined by side edges whose lengths extend along the sidewall;
    at least one gimbal cover extension segment having a first end adjacent one of the gimbal cover slot ends and a second end at the gimbal cover butt end, the at least one gimbal cover extension segment having one side which is defined by one of the side edges of one of the first and second gimbal slots, and the gimbal base protection segment extending radially inward from the second end of the at least one gimbal cover extension segment;
    wherein said hollowed interior is accessible through a gimbal receiving end of said tubular sidewall which is opposite the gimbal cover butt end;
    wherein said hollowed interior has a circumference sized and shaped to mate with the gimbal of the shaft, and
    said at least one pair of gimbal slots are sized and shaped to outline a respective pair of slots of said gimbal, thus retaining a shape of said gimbal to receive a gimbal supporting pin.

2. A gimbal cover as recited in claim 1, wherein said gimbal cover receptacle base protection segment extends radially inward from said gimbal cover butt end of said tubular sidewall to at least partially cover and protect the butt end of said gimbal.

3. A gimbal cover as recited in claim 1, wherein the side edges of each of said first and second gimbal slots comprise two parallel edges extending from said gimbal cover butt end toward said gimbal receiving end of said tubular sidewall, terminating at the respective gimbal cover slot end.

4. A gimbal cover as recited in claim 1, wherein the side edges of each of said at least one pair of gimbal slots comprise two converging edges extending from said gimbal cover butt end toward said gimbal receiving end of said tubular sidewall, terminating at the respective gimbal cover slot end, wherein a first gimbal span of each of said first and second gimbal slots proximate said gimbal cover butt end is wider than a second gimbal span of each of said first and second gimbal slots proximate said respective gimbal cover slot end.

5. A gimbal cover as recited in claim 1, said at least one pair of gimbal slots further comprising two pairs of gimbal slots, one pair of said two pairs of gimbal slots being located along an axis that is perpendicular to an axis of a second pair of said two pairs of gimbal slots.

6. A gimbal cover as recited in claim 1, the cover being sized and shaped to mate with and subsequently assembled onto one of:
   a. a gimbal of a fishing rod,
   b. a gimbal of a dock power cable retainer,
   c. a gimbal of a rod holder assembly, and
   d. a gimbal of a tripod rod holder assembly.

7. A gimbal cover as recited in claim 1, the cover being fabricated of at least one protective material, said at least one protective material being selected from a group consisting of:
   a. plastic,
   b. nylon,
   c. natural rubber,
   d. synthetic rubber,
   e. acetal,
   f. acetal polyoxymethylene resin,
   g. Polyvinylchloride (PVC), and
   h. a composite material comprising a woven base embedded within a resin.

8. A gimbal cover adapted for covering a gimbal located at a butt end of a shaft, the gimbal cover comprising:
   a gimbal cover body comprising a cylindrically shaped hollowed interior formed within a tubular sidewall terminating at a gimbal cover butt end;
   a gimbal cover receptacle base protection segment formed as a cantilevered flat member, extending radially inward from said gimbal cover butt end of said tubular sidewall, said gimbal cover receptacle base protection segment having an interior surface adapted to contact and cover the gimbal at the butt end of the shaft;
   at least one pair of gimbal slots is provided through said gimbal cover butt end and extending through and along said sidewall, where a first gimbal slot of said at least one pair of gimbal slots is located opposite a second gimbal slot of said at least one pair of gimbal slots, said at least one pair of gimbal slots comprising a base slot extending radially across the gimbal cover butt end which connects the first and second gimbal slots so as to allow communication therebetween, each of said first and second gimbal slots extending upwards away from the gimbal cover butt end and the base slot along the sidewall of the gimbal cover body, each of the first and second gimbal slots terminating at gimbal cover slot ends, each of the first and second gimbal slots defined by side edges whose lengths extend along the sidewall;
   at least one gimbal cover extension segment having a first end adjacent one of the gimbal cover slot ends and a second end at the gimbal cover butt end, the at least one gimbal cover extension segment having one side which is defined by one of the side edges of one of the first and second gimbal slots, and the gimbal base protection segment extending radially inward from the second end of the at least one gimbal cover extension segment;
   wherein said hollowed interior is accessible through a gimbal receiving end of said tubular sidewall which is opposite the gimbal cover butt end,
   wherein said hollowed interior has a circumference sized and shaped to mate with the gimbal of the shaft, and said at least one pair of gimbal slots are sized and shaped to outline a respective pair of slots of said gimbal, thus retaining the size and shape of said gimbal to receive a gimbal supporting pin.

9. A gimbal cover as recited in claim 8, wherein said gimbal cover receptacle base protection segment extends radially inward from said gimbal cover butt end of said tubular sidewall to at least partially cover and protect a butt end of said gimbal.

10. A gimbal cover as recited in claim 8, wherein the side edges of each of said first and second gimbal slots comprise two parallel edges extending from said gimbal cover butt end toward said gimbal receiving end of said tubular sidewall, terminating at the respective gimbal cover slot end.

11. A gimbal cover as recited in claim 8, wherein the side edges of each of said at least one pair of gimbal slots comprise two converging edges extending from said gimbal cover butt end toward said gimbal receiving end of said tubular sidewall, terminating at the respective gimbal cover slot end, wherein a first gimbal span of each of said first and second gimbal slots proximate said gimbal cover butt end is wider than a second gimbal span of each of said first and second gimbal slots proximate said respective gimbal cover slot end.

12. A gimbal cover as recited in claim 8, said at least one pair of gimbal slots further comprising two pairs of gimbal slots, one pair of said two pairs of gimbal slots being located along an axis that is perpendicular to an axis of a second pair of said two pairs of gimbal slots.

13. A gimbal cover as recited in claim 8, the cover being sized and shaped to mate with and subsequently assembled onto one of:
   a. a gimbal of a fishing rod,
   b. a gimbal of a dock power cable retainer,
   c. a gimbal of a rod holder assembly, and
   d. a gimbal of a tripod rod holder assembly.

14. A gimbal cover as recited in claim 8, the cover being fabricated of at least one protective material, said at least one protective material being selected from a group consisting of:
   a. plastic,
   b. nylon,
   c. natural rubber,
   d. synthetic rubber,
   e. acetal,
   f. acetal polyoxymethylene resin,
   g. Polyvinylchloride (PVC), and
   h. a composite material comprising a woven base embedded within a resin.

15. A gimbal cover adapted for covering a gimbal located at a butt end of a shaft, the gimbal cover comprising:
   a gimbal cover body comprising a generally cylindrically shaped exterior surface and a cylindrically shaped hollowed interior formed within a tubular sidewall terminating at a gimbal cover butt end;

a gimbal cover receptacle base protection segment formed as a cantilevered flat member, extending radially inward from said gimbal cover butt end of said tubular sidewall, said gimbal cover receptacle base protection segment having an interior surface adapted to contact and cover the gimbal at the butt end of the shaft;

at least one pair of gimbal slots is provided through said gimbal cover butt end and extending through and along said sidewall, where a first gimbal slot of said at least one pair of gimbal slots is located opposite a second gimbal slot of said at least one pair of gimbal slots, said at least one pair of gimbal slots comprising a base slot extending radially across the gimbal cover butt end which connects the first and second gimbal slots so as to allow communication therebetween, each of said first and second gimbal slots extending upwards away from the gimbal cover butt end and the base slot along the sidewall of the gimbal cover body, each of the first and second gimbal slots terminating at gimbal cover slot ends, each of the first and second gimbal slots defined by side edges whose lengths extend along the sidewall;

at least one gimbal cover extension segment having a first end adjacent one of the gimbal cover slot ends and a second end at the gimbal cover butt end, the at least one gimbal cover extension segment having one side which is defined by one of the side edges of one of the first and second gimbal slots, and the gimbal base protection segment extending radially inward from the second end of the at least one gimbal cover extension segment;

wherein said hollowed interior is accessible through a gimbal receiving end of said tubular sidewall which is opposite the gimbal cover butt end, wherein said hollowed interior has a circumference sized and shaped to mate with the gimbal of the shaft, and said at least one pair of gimbal slots are sized and shaped to outline a respective pair of slots of said gimbal, thus retaining a shape of said gimbal to receive a gimbal supporting pin.

16. A gimbal cover as recited in claim 15, wherein said gimbal cover receptacle base protection segment extends radially inward from said gimbal cover butt end of said tubular sidewall to at least partially cover and protect the butt end of said gimbal.

17. A gimbal cover as recited in claim 15, wherein the side edges of each of said first and second gimbal slots comprise two parallel edges extending from said gimbal cover butt end toward said gimbal receiving end of said tubular sidewall, terminating at the respective gimbal cover slot end.

18. A gimbal cover as recited in claim 15, wherein the side edges of each of said at least one pair of gimbal slots comprise two converging edges extending from said gimbal cover butt end toward said gimbal receiving end of said tubular sidewall, terminating at the respective gimbal cover slot end, wherein a first gimbal span of each of said first and second gimbal slots proximate said gimbal cover butt end is wider than a second gimbal span of each of said first and second gimbal slots proximate said respective gimbal cover slot end.

19. A gimbal cover as recited in claim 15, said at least one pair of gimbal slots further comprising two pairs of gimbal slots, one pair of said two pairs of gimbal slots being located along an axis that is perpendicular to an axis of a second pair of said two pairs of gimbal slots.

20. A gimbal cover as recited in claim 15, the cover being sized and shaped to mate with and subsequently assembled onto one of:
   a. a gimbal of a fishing rod,
   b. a gimbal of a dock power cable retainer,
   c. a gimbal of a rod holder assembly, and
   d. a gimbal of a tripod rod holder assembly.

* * * * *